(12) United States Patent
Miller et al.

(10) Patent No.: US 8,669,504 B2
(45) Date of Patent: Mar. 11, 2014

(54) HAND LAUNCHABLE UNMANNED AERIAL VEHICLE

(71) Applicants: Gerald Miller, Bedford, IN (US); James Stewart, Bloomington, IN (US)

(72) Inventors: Gerald Miller, Bedford, IN (US); James Stewart, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/790,655

(22) Filed: Mar. 8, 2013

(65) Prior Publication Data

US 2014/0027579 A1    Jan. 30, 2014

Related U.S. Application Data

(62) Division of application No. 13/623,551, filed on Sep. 20, 2012, which is a division of application No. 12/640,585, filed on Dec. 17, 2009, now Pat. No. 8,366,054.

(51) Int. Cl.
*F41F 7/00* (2006.01)

(52) U.S. Cl.
USPC ............................. 244/3.1; 244/3.15; 244/63

(58) Field of Classification Search
USPC ......................... 244/3.1, 3.15–3.18, 3.21, 63
See application file for complete search history.

(56) References Cited

U.S. PATENT DOCUMENTS

| | | | |
|---|---|---|---|
| 3,945,588 A | | 3/1976 | Maglio, Jr. |
| 4,553,718 A | * | 11/1985 | Pinson ........................ 244/3.15 |
| 4,733,609 A | * | 3/1988 | Goodwin et al. ............. 102/213 |
| 4,859,054 A | | 8/1989 | Harrison |
| 5,049,740 A | | 9/1991 | Pines et al. |
| 5,211,356 A | | 5/1993 | McWilliams et al. |
| 6,157,875 A | | 12/2000 | Hedman et al. |
| 6,244,535 B1 | * | 6/2001 | Felix ........................... 244/3.16 |
| 6,761,117 B1 | | 7/2004 | Benz |
| 7,481,145 B1 | | 1/2009 | Turner, Jr. |
| 2003/0116677 A1 | * | 6/2003 | Young et al. .................... 244/63 |
| 2004/0015273 A1 | | 1/2004 | Leonard et al. |
| 2004/0237825 A1 | | 12/2004 | Ronn et al. |
| 2006/0196383 A1 | | 9/2006 | Parker et al. |
| 2006/0278757 A1 | | 12/2006 | Kelleher |
| 2009/0039197 A1 | | 2/2009 | Maynard et al. |
| 2012/0037749 A1 | * | 2/2012 | Lance et al. ................. 244/3.12 |

* cited by examiner

*Primary Examiner* — Tien Dinh
*Assistant Examiner* — Nicholas McFall
(74) *Attorney, Agent, or Firm* — Christopher A. Monsey (57) ABSTRACT

An unmanned aerial vehicle including a controller operating in a search mode of operation where a receiver of an acquisition sensor searches for a target and causes flight control surfaces to guide the vehicle in a downward spiral path, a terminal mode of operation where the acquisition sensor detects a target and causes flight control surfaces to direct the vehicle toward the target, and an activation mode of operation where a trigger sensor detects a target within a predetermined distance to the vehicle and the controller activates a responder.

11 Claims, 10 Drawing Sheets

HAND LAUNCHABLE UNMANNED AERIAL VEHICLE

CROSS-REFERENCE TO RELATED APPLICATION

This application is a divisional of U.S. patent application Ser. No. 13/623,551, filed Sep. 20, 2012, titled "HAND LAUNCHABLE UNMANNED AERIAL VEHICLE", which is a divisional of U.S. Pat. No. 8,366,054, issued Feb. 5, 2013, titled "HAND LAUNCHABLE UNMANNED AERIAL VEHICLE", the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY OF THE DISCLOSURE

The present invention relates generally to aerial vehicles and, more particularly to unmanned aerial vehicles configured to be guided to a target.

It is known to utilize unmanned aerial vehicles (UAV) for reconnaissance and for directing to a desired target, illustratively through a remote user interface.

According to an illustrative embodiment of the present disclosure, an unmanned vehicle includes a body defining a longitudinal axis, a first wing extending laterally in a first direction from the body, and a second wing extending laterally in a second direction from the body, the second direction being opposite the first direction. A first flight control surface is supported by the body and is configured to control pitch of the vehicle. A first actuator is operably coupled to and configured to pivot the first flight control surface. A second flight control surface is supported by the body and is configured to control yaw of the vehicle. A second actuator is operably coupled to and configured to pivot the second flight control surface. A controller includes a flight control system in electrical communication with the first actuator and the second actuator. A propulsion device is operably coupled to the body. An acquisition sensor is operably coupled to the body and is in electrical communication with the controller. The acquisition sensor includes a receiver directed downwardly from the body and is configured to identify a target. A trigger sensor is operably coupled to the body and is in electrical communication with the controller. The trigger sensor includes a receiver configured to detect proximity to a target. A responder is operably coupled to the body and is in electrical communication with the controller. The controller operates in a search mode of operation where the receiver of the acquisition sensor searches for a target and causes the first actuator and the second actuator to direct the vehicle in a downward spiral path, a terminal mode of operation where the acquisition sensor detects the target and causes the first actuator and the second actuator to direct the vehicle toward the target, and an activation mode of operation where the trigger sensor detects the target within a predetermined distance to the vehicle and activates the responder.

According to a further illustrative embodiment of the present disclosure, a method of operating an unmanned aerial vehicle includes the steps of storing an aerial vehicle within a holder of a portable launcher, releasing a deployment mechanism to propel the aerial vehicle upwardly into the air, and activating a propulsion device at a first distance from the launcher. The method further illustratively includes the steps of arming a trigger sensor at a second distance from the launcher, modifying flight control surfaces to guide the aerial vehicle in a downward spiral path in a search mode of operation, and searching for a target in the search mode of operation. The method also illustratively includes the steps of acquiring the target, and modifying the flight control surfaces to guide the vehicle toward the target in a terminal mode of operation. Further illustratively, the method includes the steps of detecting a stimulus at the trigger sensor, and activating a responder in response to the detected stimulus in an activation mode of operation.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 4:
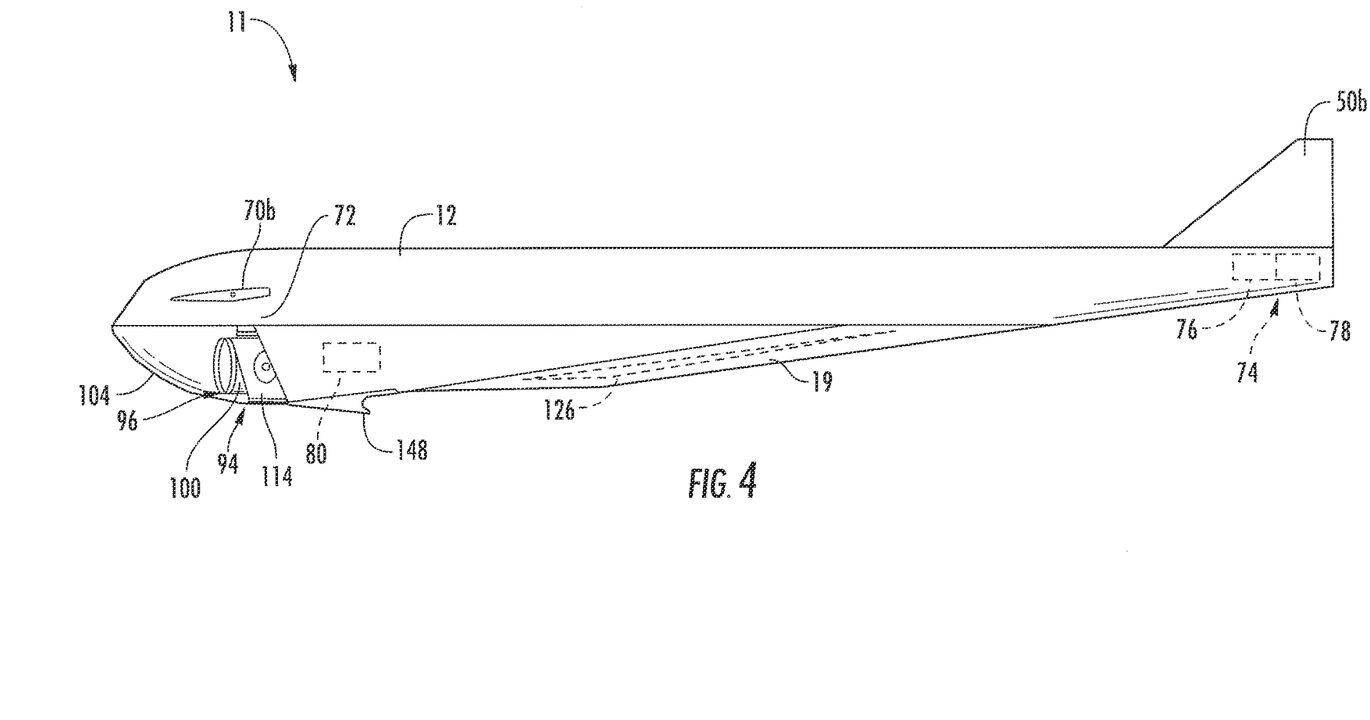
FIG. 4 is a side elevational view of the UAV of FIG. 1, with the wings removed for clarity.

Referring initially to FIGS. 1-4, an aerial vehicle system 10 according to an illustrative embodiment of the present disclosure includes an unmanned aerial vehicle 11 having a body 12 defining a longitudinal axis 14. A first wing 16 extends laterally outwardly from the body 12 in a first direction, while a second wing 18 extends laterally outwardly from the body 12 in a second direction opposite from the first direction. Illustratively, the body 12 and wings 16 and 18 are formed of a durable, light weight material such as a carbon fiber composite. A payload compartment 19 may be removably coupled to the body 12 (FIG. 4).

Figure 1:
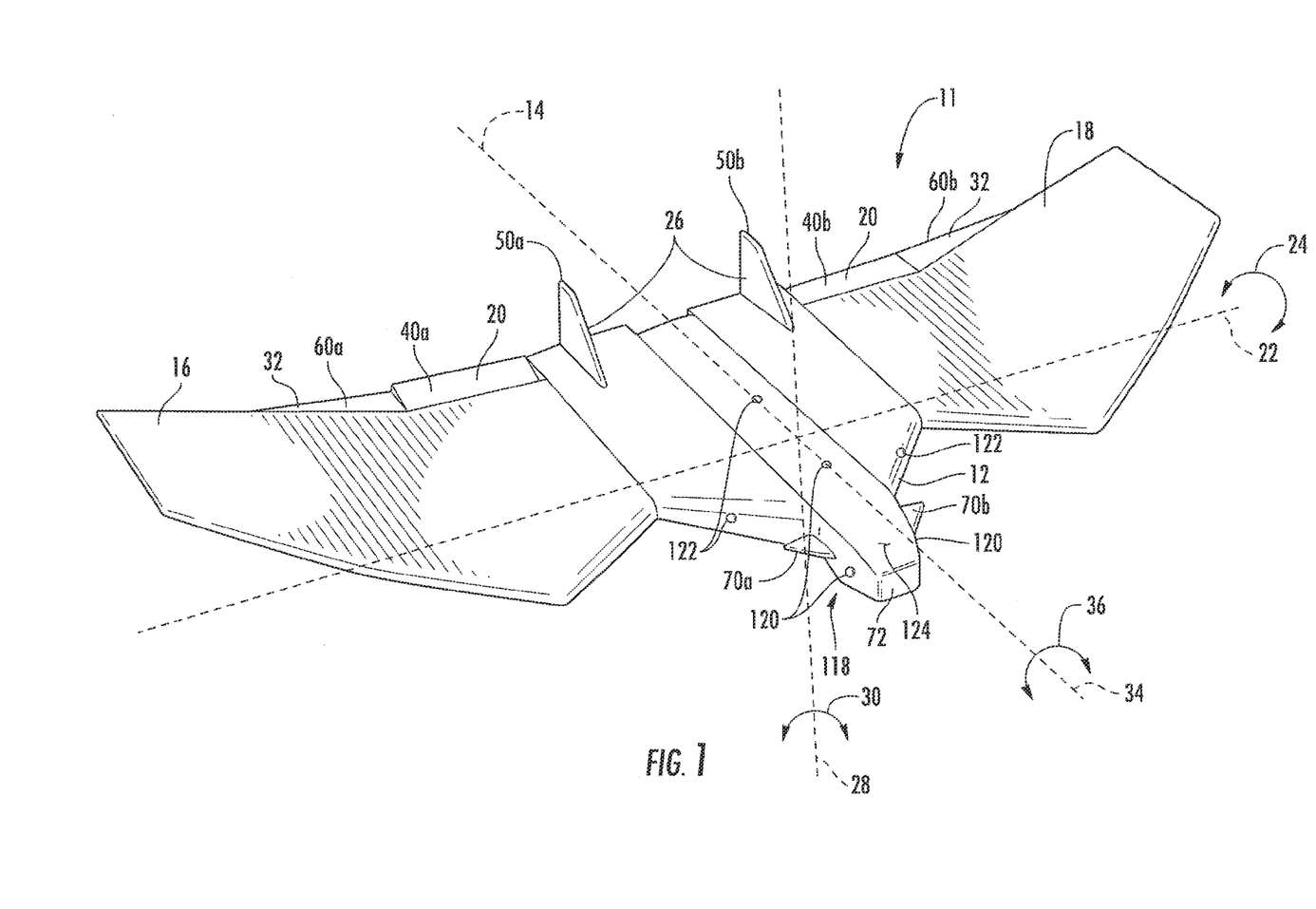
FIG. 1 is a perspective view of an illustrative unmanned aerial vehicle (UAV) of the present disclosure.
Figure 2:
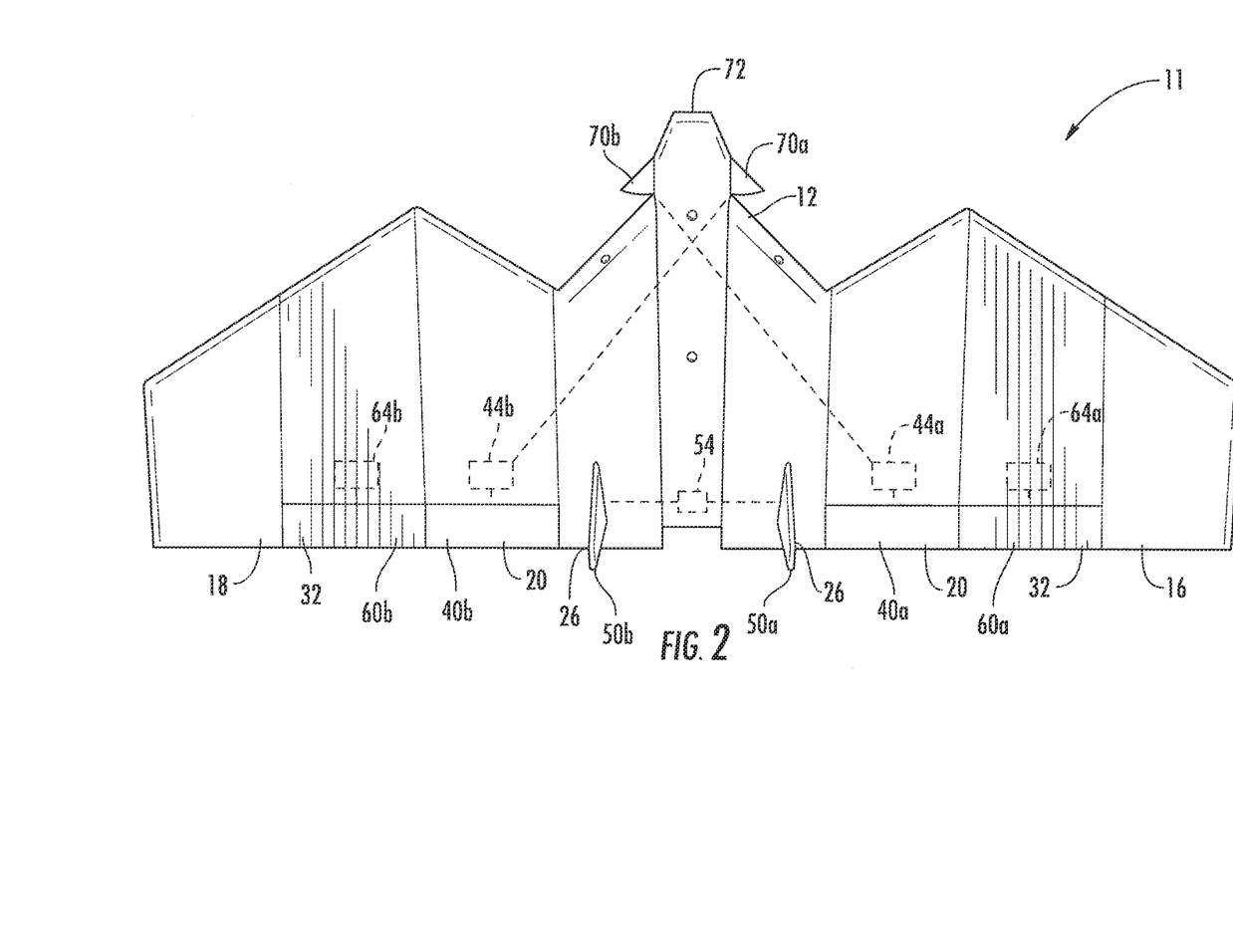
FIG. 2 is a top plan view of the UAV of FIG. 1.
Figure 3:
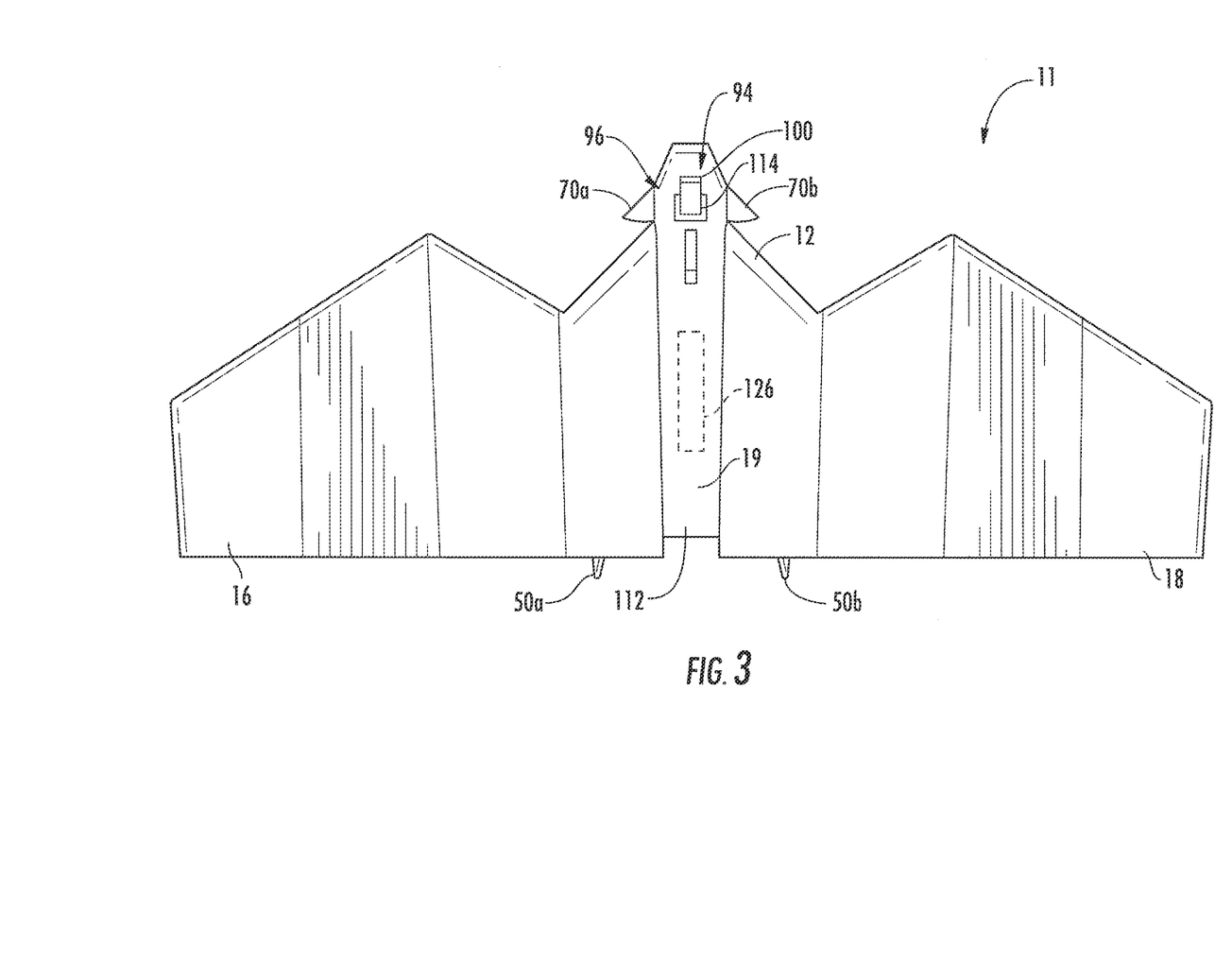
FIG. 3 is a bottom plan view of the UAV of FIG. 1.

With further reference to FIGS. 1 and 2, a first flight control surface 20 is supported by the body 12 and is configured to control pitch of the vehicle 11. Rotation of the vehicle 11 about a lateral axis 22 (shown by arrow 24 in FIG. 1) is typically called pitch. Similarly, a second flight control surface 26 is supported by the body 12 and is configured to control yaw of the vehicle 11. Rotation of the vehicle 11 about a vertical axis 28 (shown by arrow 30 in FIG. 1) is typically called yaw. Finally, a third flight control surface 32 is illustratively supported by the body 12 and is configured to control roll of the vehicle 11. Rotation of the vehicle 11 about a longitudinal axis 34 (shown by arrow 36 in FIG. 1) is typically called bank or roll.

In the illustrative embodiment, the first flight control surface 20 is defined by first and second elevators or horizontal stabilizers 40a and 40b supported by the first and second wings 16 and 18, respectively. The elevators 40a and 40b are operably coupled to first or pitch actuators 44a and 44b, such as servo motors or hydraulic cylinders, to pivot the elevators 40a and 40b relative to the wings 16 and 18, respectively. In the illustrative embodiment, the second flight control surface 26 is defined by first and second rudders or vertical stabilizers 50a and 50b supported by the first and second wings 16 and 18, respectively. A second or yaw actuator 54 is illustratively operably coupled to the rudders 50a and 50b and is configured to pivot the rudders 50a and 50b relative to the wings 16 and 18, respectively. The third flight control surface 32 is illustratively defined by ailerons 60a and 60b supported by the wings 16 and 18 and disposed laterally outwardly from the elevators 40a and 40b. Third or roll actuators 64a and 64b are illustratively operably coupled to and configured to pivot the ailerons 60a and 60b relative to the wings 16 and 18, respectively. The ailerons 60a and 60b are optional, in that the elevators 40a and 40b may perform the function of the ailerons 60a and 60b. Moreover, the elevators 40a and 40b may control both pitch and roll of the vehicle 11.

Optional canards 70a and 70b illustratively supported near a nose portion 72 of the body 12. The canards 70a and 70b may be pivotally moved by the actuators 44a and 44b and may be used to increase responsiveness of the vehicle 11. For example, when coupled to movement of the elevators 40a and 40b, the canards 70a and 70b improve flight performance of the vehicle 11. The actuators 44, 54, and 64 may comprise directional servo motors or hydraulic actuators coupled to the respective flight control surfaces 20, 26, and 32 by appropriate couplers, such as conventional mechanical linkages.

Figure 6:
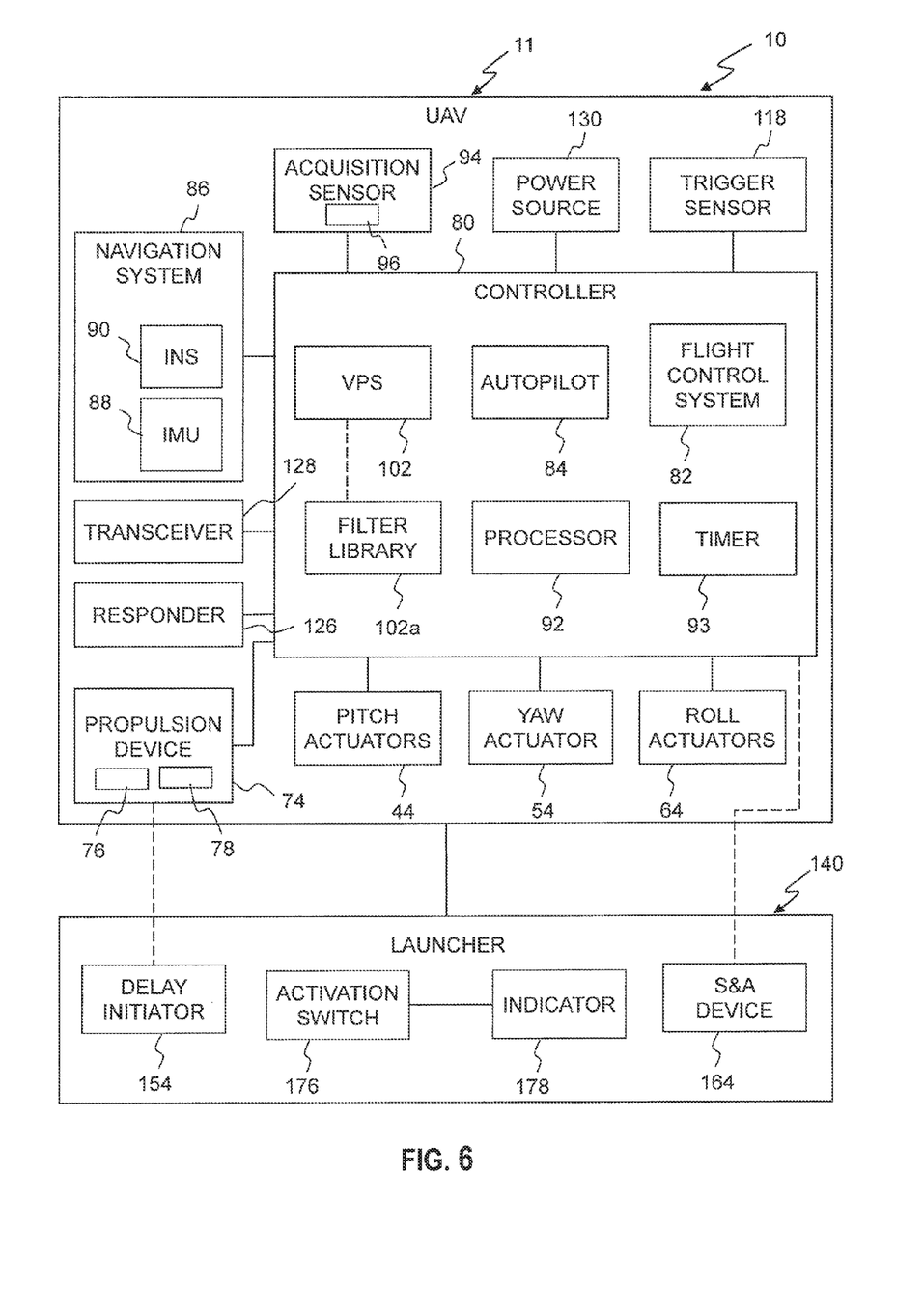
FIG. 6 is a block diagram illustrating interconnection between various components of the system of FIG. 1.

With reference to FIGS. 4 and 6, a propulsion device 74 is operably coupled to the body 12 and is configured to propel the vehicle 11 in the air. The propulsion device 74 may comprise a conventional solid rocket motor 76 including an igniter or trigger 78. The igniter 78 may be a conventional charge that ignites or actuates the rocket motor 76.

As shown in FIG. 6, a controller 80 includes a flight control system 82 in electrical communication with the actuators 44, 54, and 64. An autopilot 84 may be provided in communication with the flight control system 82. The autopilot 84 coordinates with the flight control system 82 to coordinate flight of the vehicle 11. As further detailed herein, a flight path for the vehicle 11 may be preset and stored within the autopilot 84. The autopilot 84 may comprise one of the Piccolo systems available from Cloud Cap Technology of Hood River, Oreg.

The vehicle 11 illustratively further includes a navigation system 86 in electrical communication with the controller 80. The navigation system 86 illustratively includes an inertial measurement unit (IMU) 88 to detect changes in pitch, roll, and yaw of the vehicle 11. More particularly, the IMU 88 is illustratively a 3-axis device providing calibrated rate and acceleration data to the controller 80. Navigation system 86 further illustratively includes an inertial navigational system (INS) 90 to determine position, orientation, and velocity of the vehicle 11. The INS 90 may include a global positioning system (GPS) to provide vector flight guidance to the flight control system 82. The navigation system 86 illustratively provides information from the IMU 88 and the INS 90 to a processor 92 of the controller 80. The processor 92 illustratively includes memory for storing operation software. A clock or timer 93 is illustratively in communication with the processor 92. In one illustrative embodiment, the IMU 88 and the INS 90 be of the types available from Cloud Cap Technology.

With reference to FIGS. 4 and 6, an acquisition sensor 94 is operably coupled to the body 12 and is in electrical communication with the controller 80. The acquisition sensor 94 illustratively includes a receiver 96 directed downwardly from the body 12 and configured to collect light from a target 98. The receiver 96 of the acquisition sensor 94 illustratively comprises an optical sensor 100 configured to receive short wave infrared (SWIR) light. The controller 80 illustratively includes a video processor or VPS 102 configured to receive input from the receiver 96, to identify and acquire the target 98, and to coordinate with the autopilot 84 and the flight control system 82 to provide terminal guidance to the target 98.

Figure 7:
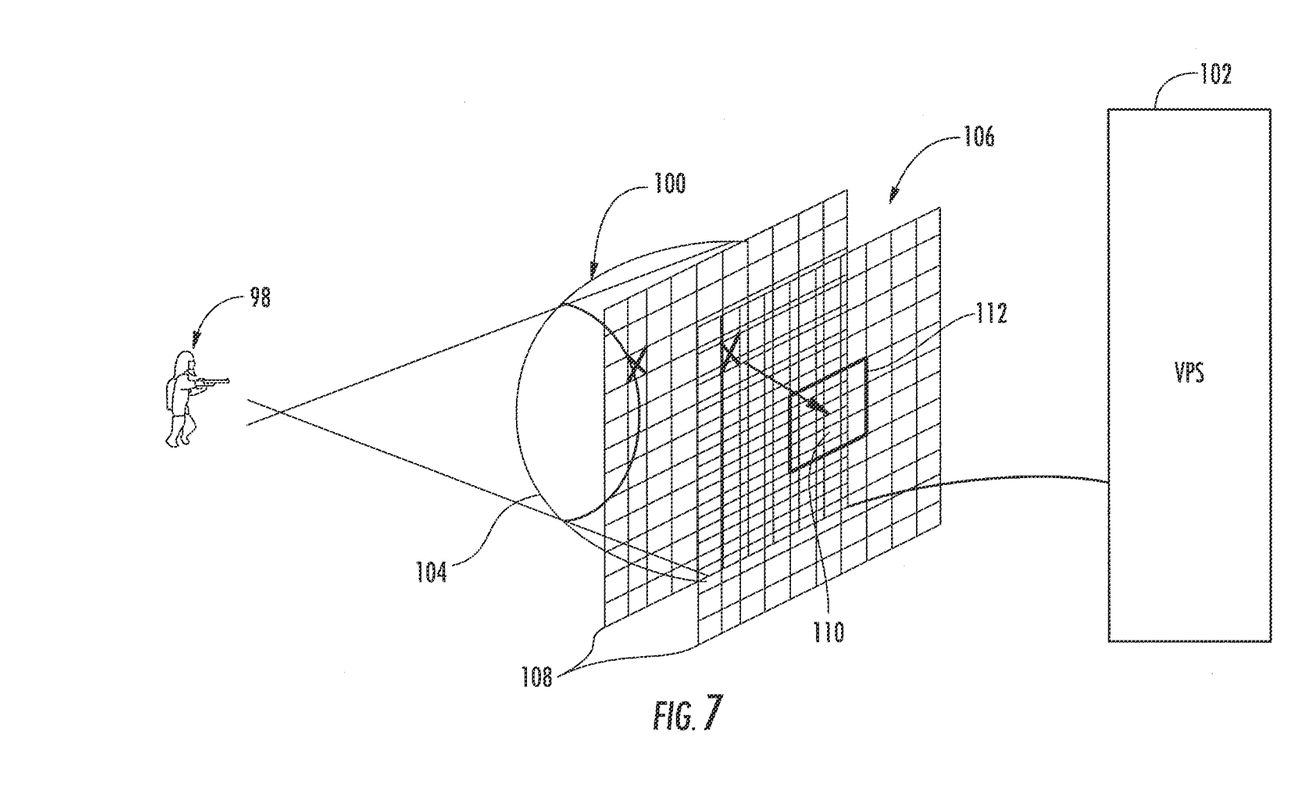
FIG. 7 is a diagrammatic representation of a focal plane array of the optical sensor of the present disclosure.

A lens 104 is configured to protect and direct infrared light to the optical sensor 100 for processing by the VPS 102. The lens 104 is illustratively formed of a non-SWIR interfering polyethylene. As shown in FIG. 7, the VPS 102 includes a focal plane array 106 having a software generated collector grid 108 to receive infrared light collected from the lens 104 as a collected image 110 of the target 98, wherein the VPS 102 compares the collected image 110 to a stored image of the desired target 98. More particularly, filter software with masking conditions look for a "hot spot" in a target area 111 below the vehicle 11. For example, a filter library 102a may be saved within filter software stored within the VPS 102 and includes a plurality of stored images of known targets. More particularly, the filter library 102a may illustratively store a plurality of mask forms and pattern pixilations for known targets.

If the VPS 102 determines that the collected image 110 and a stored image within the filter library 102a are substantially identical, then the controller 80 acquires the target 98. Moreover, the VPS 102 attempts to match parametric goals and target recognition by comparing temperature indications to pixels in mask. When a "hot spot" is found, then the next filter is applied by the VPS 102 as a comparison with stored mask forms and pattern recognitions within the filter library 102a (e.g., enemy hot weapon, etc.). Additional library parameters may be stored within the filter library 102a, the VPS 102 and/or the processor 92, such as body temperature, enemy combatant form, and other "not friend" indicators. In certain embodiments, the filter library 102a may also be used to filter out undesired "noise," such as chlorophyll in jungle environments.

Once acquired, the controller 80 then adjusts the actuators 44, 54, and 64 to alter the flight path of the vehicle 11 and reposition the collected image 110 of the target 98 within a center portion 112 of the collector grid 108. More particularly, the processor 92 receives input from the VPS 102 and coordinates with the autopilot 84 and the flight control system 82 to activate the actuators 44, 54, and 64 as needed to maintain the image 110 within the center portion 112 of the collector grid 108. In one illustrative embodiment, the optical sensor 100 comprises a SU640KTS NTSC SWIR camera available from BF Goodrich of Princeton, N.J.

With further reference to FIG. 4, the optical sensor 100 is illustratively supported below the nose portion 72 of the body 12 by a gimbal device 114. The gimbal device 114 is illustratively motorized to provide for pivoting movement of the optical sensor 100 about perpendicular axes. In one illustrative embodiment, the gimbal device 114 may the TASE LT gimbal available from Cloud Cap Technology.

A trigger sensor 118 is operably coupled to the body 12 and is in electrical communication with the controller 80. Illustratively, the trigger sensor 118 includes a receiver configured to detect proximity to the target 98. In the illustrative embodiment, the trigger sensor 118 includes a plurality of light emitting diodes (LEDs) including emitters 120 and cooperating receivers 122. The emitters 120 and receivers 122 may be supported in various locations on an outer surface 124 of the body 12 of the vehicle 11 (FIG. 1). The receivers 122 are configured to receive light from the emitters 120 and to transmit a signal to the controller 80 when sufficient light is detected (typically between 30 feet and 1 foot). Illustratively, the signal is transmitted when sufficient light from the respective emitter 120 is reflected off of a surface within a desired proximity thereto and received by the corresponding receiver 122.

As shown in FIGS. 4 and 6, a responder 126 is operably coupled to the body 12 and is in electrical communication with the controller 80. The responder 126 is configured to be activated by the controller 80 in response to a stimulus. Illustratively, the responder 126 comprises an explosive received within the payload compartment and detonated by the controller 80 in response to a signal from the trigger sensor. In other illustrative embodiments, the responder 126 may comprise a non-lethal weapon (such as rubber projectiles or bullets), a crowd dispersal device (such as tear gas), or reconnaissance devices (such as electronic surveillance equipment).

With further reference to FIG. 6, a transceiver 128 may be in electrical communication with the controller 80 for providing wireless communication with a remote unit, such as a base controller (not shown). A power source 130 is supported within the body 12 and is electrically coupled to the controller 80 for supplying electrical components of the vehicle 11. Illustratively, the power source 130 includes a plurality of lithium ion batteries.

Figure 5:
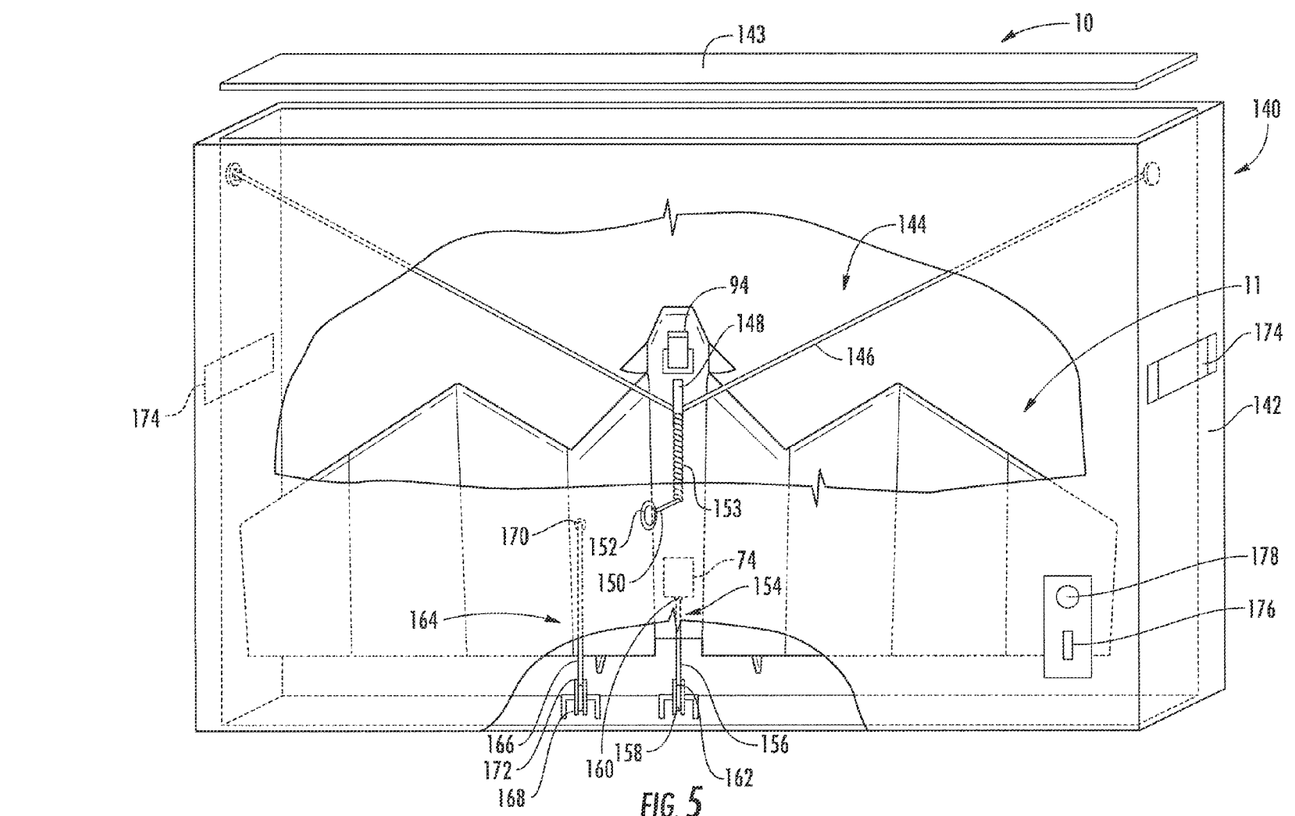
FIG. 5 is a perspective view of an aerial vehicle system, showing the UAV of FIG. 1 in a stored position within a portable launcher of the present disclosure, with a partial cutaway of the launcher.

With reference to FIG. 5, the system 10 further includes a launcher 140 including a support or case 142 to hold the vehicle 11 in a stored mode of operation. An optional cover 143 may be used to protect the vehicle 11 prior to launch. The launcher 140 further includes a deployment mechanism 144 configured to launch or propel the vehicle 11 upwardly into the air in a launch mode of operation. In the illustrative embodiment, the deployment mechanism 144 comprises a spring biased catapult or bow 146 operably coupled to the support 142. The body 12 of the vehicle 11 includes a hook 148 configured to engage the catapult 146 in a stored mode of operation. A holder in the form of a pin 150 secures the catapult in a biased, downward position. By pulling a handle 152 coupled to the pin 150, the catapult 146 releases the spring 153 biasing the catapult 146, and forces the hook 148 and therefore the body 12 upwardly such that the vehicle 11 is propelled upwardly into the air away from the launcher 140.

Figures 8A, 8B, 8C:
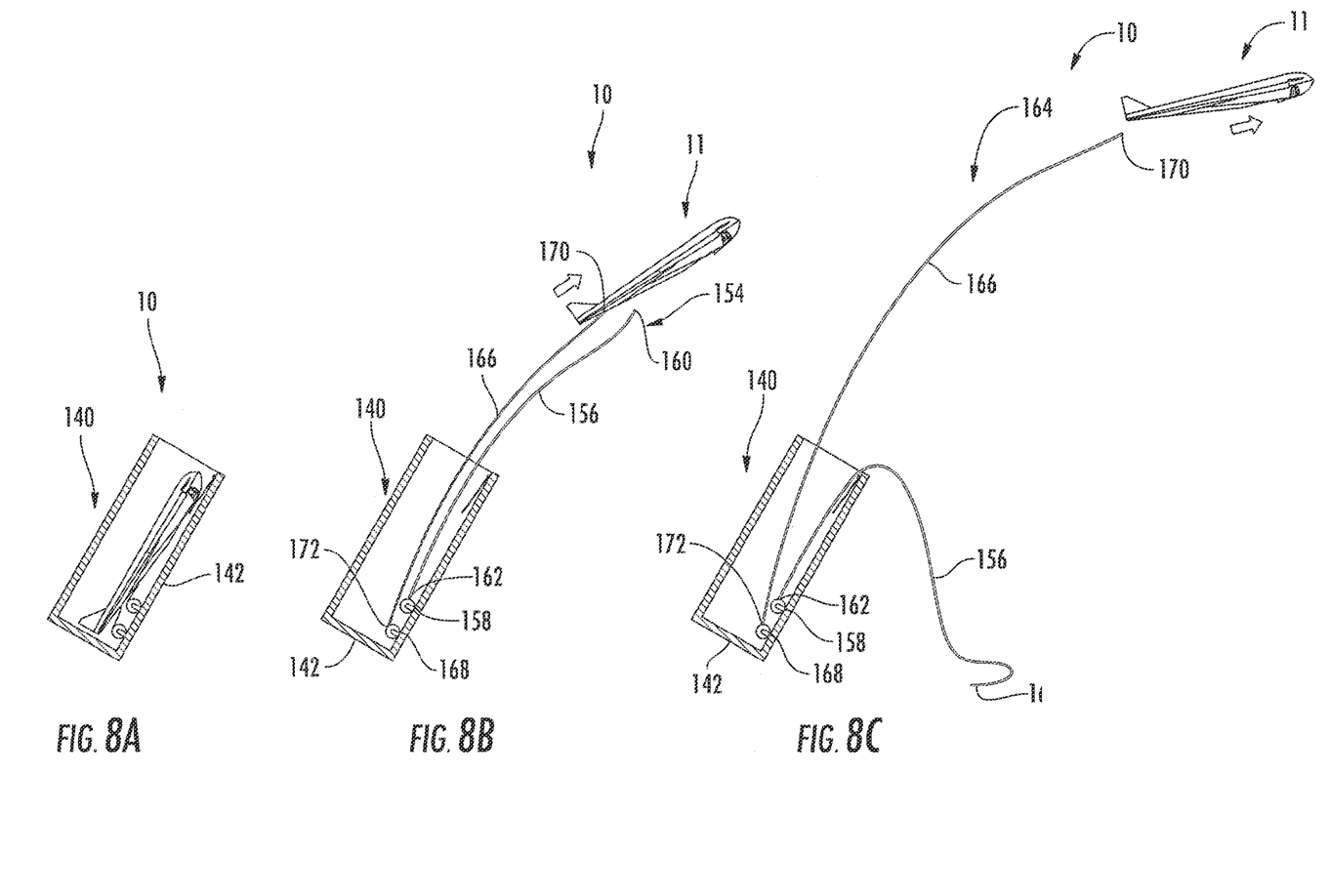
FIGS. 8A-8C illustrate the system of FIG. 1 in stored and launched modes of operation.

With reference to FIGS. 5 and 8B, the launcher 140 includes a delay initiator 154 for activating the propulsion device 74 when the vehicle 11 has reached a first predetermined distance from the launcher 140 (illustratively 10 feet from the launcher 140). Illustratively, the delayed initiator 154 comprises a tether 156 extending between the launcher 140 and the igniter 78 of the propulsion device 74. Prior to launch, the tether 156 is wound onto a rotatably supported reel 158. Upon launch, an upper end 160 of the tether 156 is attached to the igniter 78 of the propulsion device 74, such that the tether 156 unwinds from the reel 158. A lower end 162 of the tether 156 is fixed to the launcher 140, such that when the vehicle 11 travels the length of the tether 156, the upper end 160 disconnects from the igniter 78 thereby activating the igniter 78 of the propulsion device 74.

Further illustratively, a safe and arm device 164 is supported by the body 12 and is configured to arm the responder 126 when the vehicle 11 has reached a second predetermined distance from the launcher 140 (illustratively 100 feet from the launcher 140). Illustratively, the safe and arm device 164 includes a fiber optics cable 166 releasably coupled to the controller 80 in an unarmed condition. Prior to launch, the fiber optics cable 166 is wound onto a rotatably supported reel 168. Upon launch, an upper end 170 of the fiber optics cable 166 is attached to the controller 80, such that the cable 166 unwinds from the reel 168. A lower end 172 of the fiber optics cable 166 is fixed to the launcher 140, such that when the vehicle 11 travels the length of the cable 166, the upper end 170 disconnects from the controller 80. In response, the controller 80 activates the trigger sensor 118.

The case 142 is portable such that it may be easily transported by a single operator. Handles 174 may be coupled to the exterior of the case 142 to facilitate manipulation of the launcher 140. An activation switch 176 may be provided to conduct a pre-launch system check. Upon activation of the switch 176, an indicator or ready light 178 may be illuminated to provide a ready indication to the operator.

An illustrative method of operation of the system 10 of the present disclosure is shown in FIGS. 8A-10. Initially at step 202 of FIG. 10 and as illustrated in FIG. 8A, the launcher 140 is positioned in a deployment position and the cover 143 is removed from the case 142 thereby exposing the vehicle 11. As noted above, the launcher 140 is portable and illustratively may be supported by the operator. Alternatively, the launcher 140 may be supported on the ground or by a support stand (not shown). Once the case 142 is properly supported, the operator moves the activation switch 176 to an "ON" or "ARM" position. The controller 80 initializes the system 10 and conducts a components check. The ready light 178 is illuminated to indicate system ready status.

Once the launcher 140 is ready to launch, at block 204 the operator aims the case 142 in a desired vector (typically from between negative 30 degrees to positive 60 degrees relative to horizontal). Next, the operator pulls the release pin. The spring biased catapult thereby forces the vehicle 11 upwardly into the air and away from the launcher 140 as shown in FIG. 8B.

Figure 10:
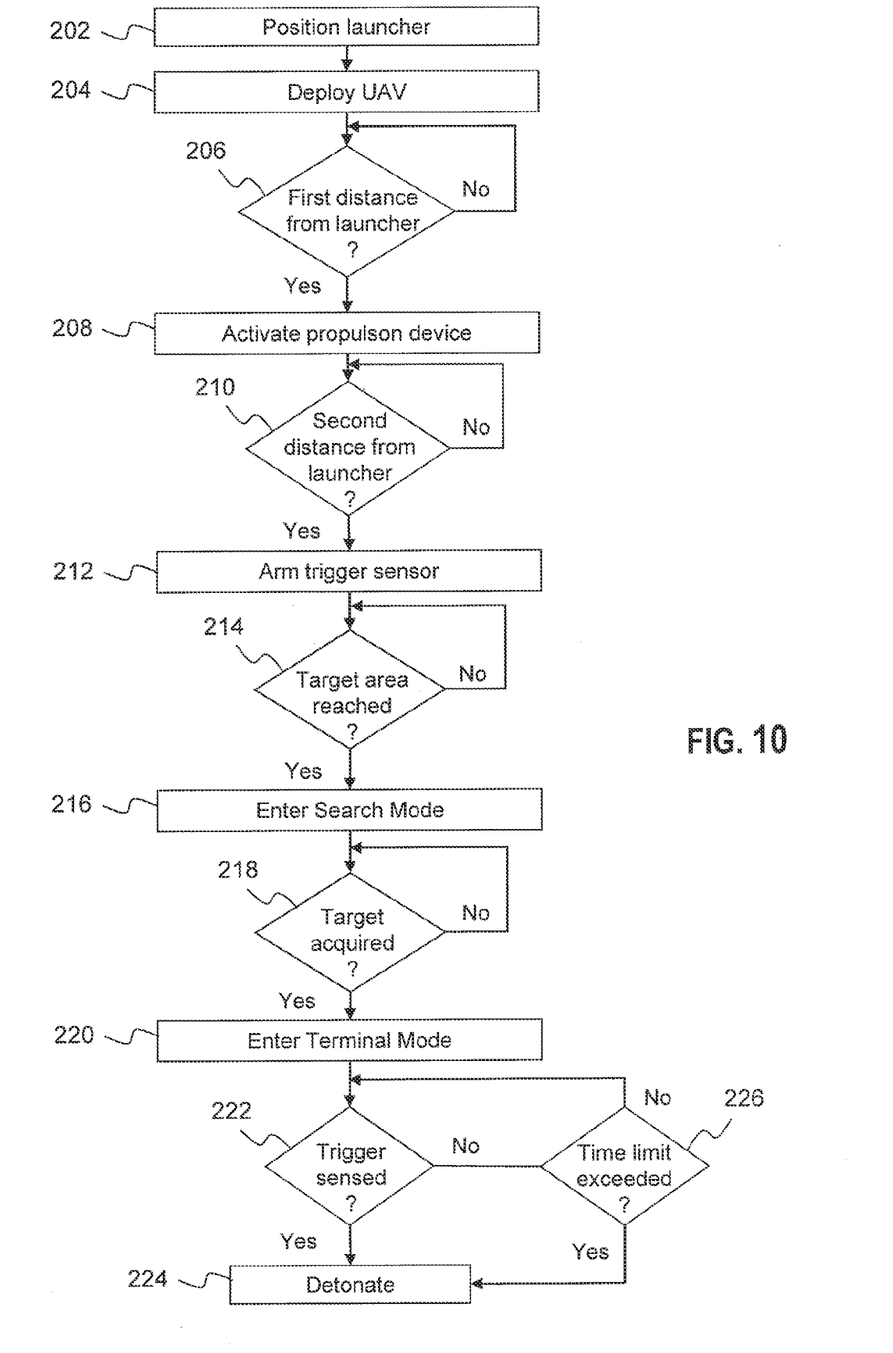
FIG. 10 is a flow chart of an illustrative method of operation of the UAV of FIG. 1.

At decision block 206, a first distance from the launcher 140 is measured by the delay initiator 154, illustratively the tether 156. If the first distance exceeds a predetermined value defined by the length of the tether 156 (illustratively 10 feet), then the propulsion device 74 is activated at block 208. More particularly, the tether 156 causes a pin to puncture the igniter 78 and cause activation of the rocket motor 76. The vehicle 11 continues under power by the propulsion device 74 and under guidance from the flight control system 82 and the autopilot 84. Illustratively, the vehicle 11 travels with the nose portion 72 elevated by approximately 60 degrees in this mode.

At decision block 210 and as shown in FIG. 8C, a second distance from the launcher 140 is measured by the safe and arm device 164, illustratively the fiber optics cable 166. If the second distance exceeds a predetermined value defined by the length of the fiber optics cable 166 (illustratively 100 feet), then the trigger sensor 118 is armed at block 212. More particularly, the upper end 170 of the fiber optics cable 166 is disconnected from the controller 80. At this point, the controller 80 detects the disconnection of the fiber optics cable 166 and the trigger sensor 118 is thereby armed.

In certain further illustrative embodiments, the responder 126 will include a second safe and arm device that will arm the responder 126 only if multiple preconditions are satisfied. Illustratively, the responder 126 will be armed if the controller 80 determines that: (1) the vehicle 11 is travelling on the proper flight vector; (2) the trigger sensor 118 has been armed; and (3) the fiber optics cable 166 has been disconnected from the controller 80. If any of these conditions are false, then the controller 80 executes a "dead-man" failsafe condition and flight of the vehicle 11 is suspended. The vehicle 11 may then be retrieved by the operator.

Figure 9:
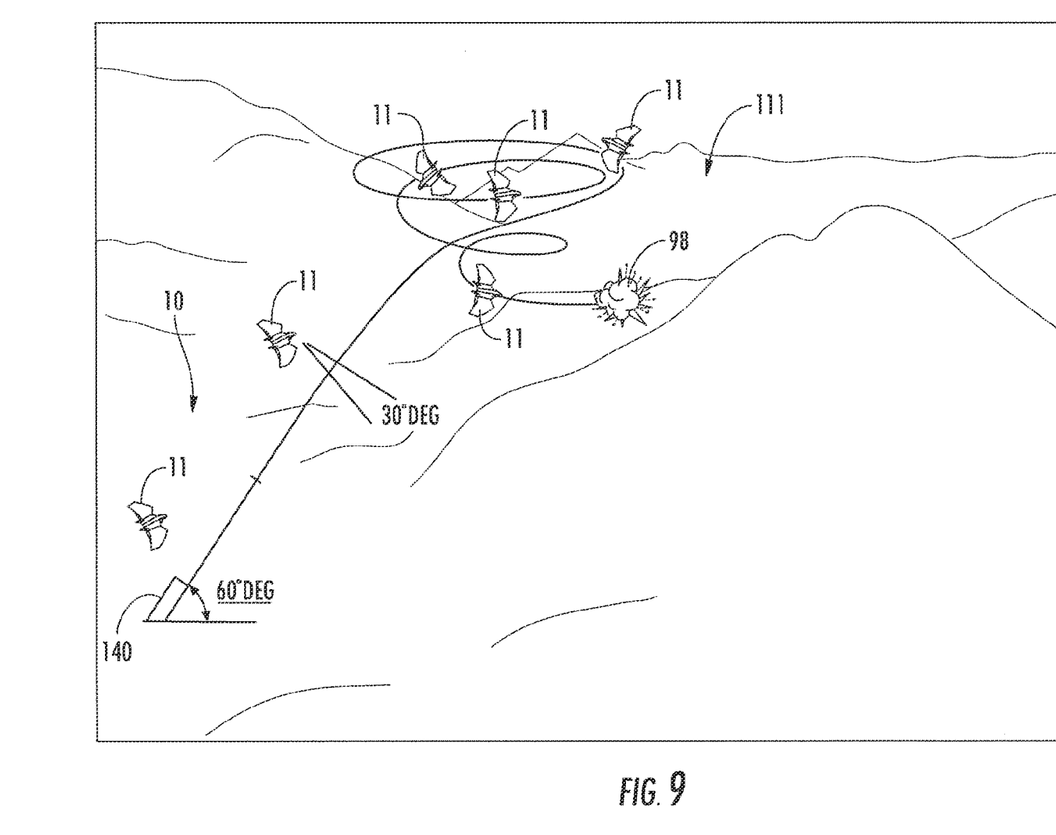
FIG. 9 is a diagrammatic view demonstrative an illustrative operation of the UAV of FIG. 1.

At decision block 214 and as shown in FIG. 9, the navigation system 86 of the controller 80 determines when the vehicle 11 has reached the desired target area 111. Once the target area 111 has been reached the controller 80 enters a search mode at block 216, where the acquisition sensor 94 starts looking for a desired target 98. More particularly, the optical sensor 100 is positioned downwardly by the gimbal device 114, illustratively at a 30 degree downward view angle.

During the search mode, the flight control system 82 and the autopilot 84 of the controller 80 causes the vehicle 11 to begin a downward spiral path as shown in FIG. 9. During this downward spiral path, the optical sensor 100 is searching for predetermined target 98. More particularly, the VPS 102 compares the collected image 110 to a stored image of the desired target 98. As further detailed herein, filter software with masking conditions look for a "hot spot" in a target area 111 below the vehicle 11. If the VPS 102 determines that the collected image 110 and the stored image are substantially identical, then the controller 80 acquires the target 98. Moreover, the VPS 102 attempts to match parametric goals and target recognition by comparing temperature indications to pixels in mask. When a "hot spot" is found, then the next filter is applied by the VPS 102 as a comparison with a stored mask forms and pattern recognition library (e.g. enemy hot weapon, etc.). Upon a match, the target is acquired and the controller 80 enters a terminal mode at block 220.

In the terminal mode, the flight control system 82 and the autopilot 84 direct the vehicle 11 directly to the target 98 (i.e. begins a "terminal dive"). During terminal flight to the target 98, the VPS 102 updates the flight path to the target 98 during regular intervals (i.e. every 0.2 seconds). If the target 98 moves, the VPS 102 will track the target and send corrected data to the autopilot 84. If the target 98 is lost by the VPS 102, then the autopilot 84 may enter a coast track mode and fly to the last best estimate of the target 98 coordinates.

If no target is acquired at block 218 (or the controller 80 fails to enter the coast track mode identified above), then the vehicle 11 may continue on a vector flight until the propulsion device 74 exhausts its fuel supply. The controller 80 may cause self-destruction of the vehicle 11 based upon a trigger signal from a heat sensor (not shown) in thermal communication with the propulsion device 74.

In other illustrative embodiments, the controller 80 may cause self-destruction of the vehicle 11 after completing a predefined number (illustratively three) of circular orbits in the search mode. In this final search mode, the vehicle 11 illustratively makes counter clockwise orbits in long sweeping circular patterns. If no target 98 is acquired or if the vehicle 11 comes in proximity to the ground, the vehicle 11 will self-destruct. If the target 98 is acquired in the final target search mode, then vehicle 11 will be directed to the target 98 via the controller 80 in the manner detailed above.

Upon reaching desired proximity to the target 98 as determined in block 222, the trigger sensor 118 is activated at block 224. More particularly, the light emitted from the LED emitter 120 is received by the receiver 122 thereby defining a stimulus. Upon receiving of the light by the receiver 122, the responder 126 is activated. Illustratively, the responder 126 may be an explosive which is thereby detonated. If the trigger is not sensed at block 222 after the vehicle 11 enters the terminal phase, and after a predetermined time limit is exceeded at block 226, the explosive may detonate at block 224.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An aerial vehicle system, the system comprising:
an unmanned aerial vehicle and a portable launcher;
wherein said unmanned aerial vehicle comprises:
a body defining a longitudinal axis,
a first wing extending laterally in a first direction from the body,
a second wing extending laterally in a second direction from the body, the second direction being opposite the first direction,
a first flight control surface supported by the body and configured to control pitch of the vehicle,
a second flight control surface supported by the body and configured to control yaw of the vehicle,
a controller including a flight control system operably coupled to the first flight control surface and the second flight control surface,
a propulsion device operably coupled to the body;
an acquisition sensor including an optical receiver for detecting a target, the optical receiver including a video processor and a lens to direct light to the video processor, wherein the video processor including a focal plane array having a collector grid to receive the light from the lens;
a navigation system including an inertial measurement system for detecting pitch, roll, and yaw of the aerial vehicle, and an inertial navigational system to determine position, orientation, and velocity of the aerial vehicle;

a trigger sensor configured to generate a signal in response to a predefined stimulus; and a responder in electrical communication with the controller and configured to be activated in response to the signal from the trigger sensor;

wherein said portable launcher including a support to hold the body in a stored mode of operation, and a deployment mechanism to propel the body upwardly into the air in a launch mode of operation;

wherein the deployment mechanism comprises a catapult operably coupled to the support, the body supporting a hook configured to engage the catapult in the stored mode;

wherein the controller is in communication with the acquisition sensor, and the controller adjusts the flight control surfaces to reposition the target within the center of the collector grid of the video processor;

wherein the trigger sensor includes a plurality of light emitting diodes and a plurality of receivers configured to receive light from the plurality of light emitting diodes and in electrical communication with the controller;

wherein said acquisition sensor is mounted within a repositionable receiver assembly adapted to direct said optical receiver downwardly from the body and configured to commence target identification processing when the navigation system determines the aerial vehicle has reached an area of interest and enters a search mode.

2. The system of claim 1, further comprising:

a responder in electrical communication with the controller; and a safe and arm device configured to arm the responder at a predetermined distance from launch.

3. The system of claim 2, wherein the safe and arm device includes a fiber optics cable releasably coupled to the controller in an unarmed condition.

4. The system of claim 1, wherein the controller operates in said search mode of operation when the acquisition sensor actively seeks to identify the target and causes the flight control surfaces to direct the aerial vehicle in a downward spiral flight path, a terminal mode of operation when the acquisition sensor detects a predefined target and causes the flight control surfaces to direct the body toward the target, and an activation mode of operation when the trigger sensor detects the predefined stimulus.

5. The system of claim 1, wherein the responder comprises an explosive detonated by the controller in response to a signal from the trigger sensor.

6. The system of claim 1, wherein said plurality of light emitting diodes are positioned on different positions of the unmanned aerial vehicle including a front, top, and side sections of said unmanned aerial vehicle.

7. The system of claim 1, wherein said acquisition sensor is adapted to compare a collected image to a stored image of the target.

8. The system as of claim 7, wherein said acquisitions sensor further comprises a filter processing section with masking conditions adapted to determine if said collected image has a hot spot in said area of interest below the unmanned aerial vehicle, wherein if said acquisition sensor determines that a collected image and the stored image are substantially identical, then the controller acquires the target and activates additional filter processing sections to determine if said target is a valid target.

9. The system as in claim 8, wherein said additional filter processing comprises attempts to match parametric goals and engage in target recognition by comparing temperature indications to pixels in a mask, wherein when said hot spot is found, then a next filter is applied by the acquisition sensor as a comparison with at least one or more stored mask forms and pattern recognition library.

10. The system as in claim 9, wherein the controller operates in said search mode of operation when the acquisition sensor actively seeks to identify the target and causes the flight control surfaces to direct the aerial vehicle in a downward spiral flight path, said controller operates in a terminal mode of operation when the acquisition sensor detects a predefined target upon a match of at least one said stored said mask forms or at least one pattern recognition data in said pattern recognition library and causes the flight control surfaces to direct the body toward the target, and said controller operates in an activation mode of operation when the trigger sensor detects the predefined stimulus.

11. The system as in claim 1, where said catapult is adapted to engage with said hook such that said catapult applies force to said hook to launch said body away from said deployment mechanism.

* * * * *